United States Patent [19]
Cary

[11] 3,722,946
[45] Mar. 27, 1973

[54] CAMPER AND CABINET CONSTRUCTION THEREFOR

[76] Inventor: Thomas Francis Cary, 546 Emory St., San Jose, Calif. 95110

[22] Filed: Nov. 30, 1970

[21] Appl. No.: 93,622

[52] U.S. Cl. .................. 296/23 MC, 224/42.42 R
[51] Int. Cl. ........................................ B60p 3/32
[58] Field of Search .296/23, 23 MC, 35 A, 24, 31 A; 224/42.42

[56] References Cited

UNITED STATES PATENTS

| | | | |
|---|---|---|---|
| 3,326,595 | 6/1967 | Ogilvie | 224/42.42 R |
| 3,245,713 | 4/1966 | Ogilvie | 296/24 R |
| 2,978,153 | 4/1961 | Brindle | 224/42.42 R |
| 3,084,973 | 4/1963 | Beckley | 296/31 P |
| 3,508,781 | 4/1970 | Anderson | 296/23 MC |

Primary Examiner—Philip Goodman
Attorney—Flehr, Hohbach, Test, Albritton & Herbert

[57] ABSTRACT

A camper having a pickup with a camper body mounted on the pickup and with a cabinet construction provided on each side of the pickup and underlying overhanging portions of the camper body.

11 Claims, 10 Drawing Figures

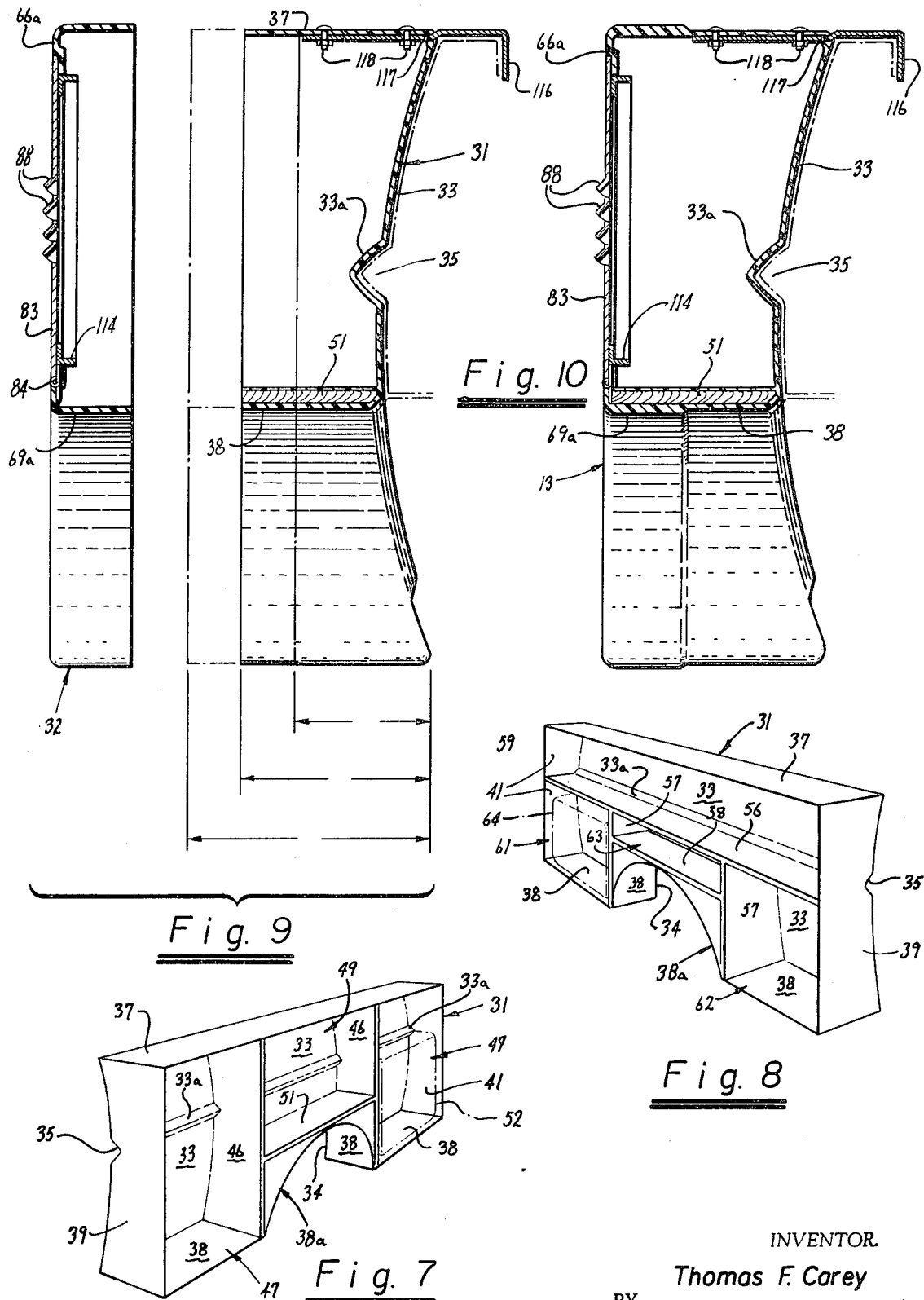

CAMPER AND CABINET CONSTRUCTION THEREFOR

BACKGROUND OF THE INVENTION

1. Field of the Invention

This invention relates to campers and more particularly to pickup-mounted campers with a removably mounted cabinet construction provided on opposite sides of the pickup body and generally underlying the camper body.

2. Description of Prior Art

Campers heretofore provided have had an inadequate storage space and, in particular, there has been insufficient storage space for relatively long articles such as brooms, mops, fishing poles and the like. In addition, campers have been relatively top-heavy. There is, therefore, a need for a new and improved camper and, in particular, a cabinet construction for use therewith.

SUMMARY OF THE INVENTION AND OBJECTS

The camper consists of a wheeled vehicle having a chassis with front and rear ground engaging wheels. A pickup body is mounted on the chassis. The body includes a cab having a driving station therein and a pickup box to the rear of the cab. The pickup box is formed with longitudinally extending side wall portions which extend outwardly sideways or laterally over the rear ground engaging wheels. The side wall portions are formed with wheel wells for the rear wheels and have outwardly extending portions extending longitudinally of the pickup body. A camper body is mounted on the pickup body and has body portions extending longitudinally of the chassis and also extending sideways or laterally from the pickup body. The cabinet is mounted on the pickup body and generally underlies the portions of the camper which extend laterally of the pickup body.

In general, it is an object of the present invention to provide a camper having additional storage space.

Another object of the invention is to provide a camper of the above character which has a lowered center of gravity.

Another object of the invention is to provide a camper of the above character with cabinets that are particularly adapted for carrying long loads.

Another object of the invention is to provide a camper of the above character in which the camper body is readily removable.

Another object of the invention is to provide a camper of the above character in which the cabinets have a construction so that they can be utilized on several different types of pickups.

Another object of the invention is to provide a camper of the above character which requires substantially no modification to the pickup being used.

Another object of the invention is to provide a camper of the above character in which the cabinets are relatively flush with the camper body.

Another object of the invention is to provide a camper with a cabinet construction of the above character which is relatively inexpensive.

Another object of the invention is to provide a cabinet construction for use with campers which can be readily adjusted for different types of campers.

Another object of the invention is to provide a cabinet construction of the above character which can be readily fabricated.

Another object of the invention is to provide a cabinet of the above character in which the depth of the cabinet can be readily adjusted.

Additional objects and features of the invention will appear from the following description in which the preferred embodiment is set forth in detail in conjunction with the accompanying drawings.

BRIEF DESCRIPTION OF THE DRAWING

FIGS. 7 and 8 are perspective views of the box-like receptacles for the cabinets shown in FIGS. 4 and 5.

FIG. 9 is an exploded view showing cross-sectional views of the box-like receptacle and lid of FIG. 4.

FIG. 10 is a cross-sectional view showing the receptacle and lid of FIG. 9 after assembly.

DESCRIPTION OF THE PREFERRED EMBODIMENT

The camper and cabinet construction, therefore, consists of a pickup 11 which has a camper body 12 mounted thereon. A cabinet construction 13 is provided which is mounted on opposite sides of the pickup below the camper body.

Figure 6:
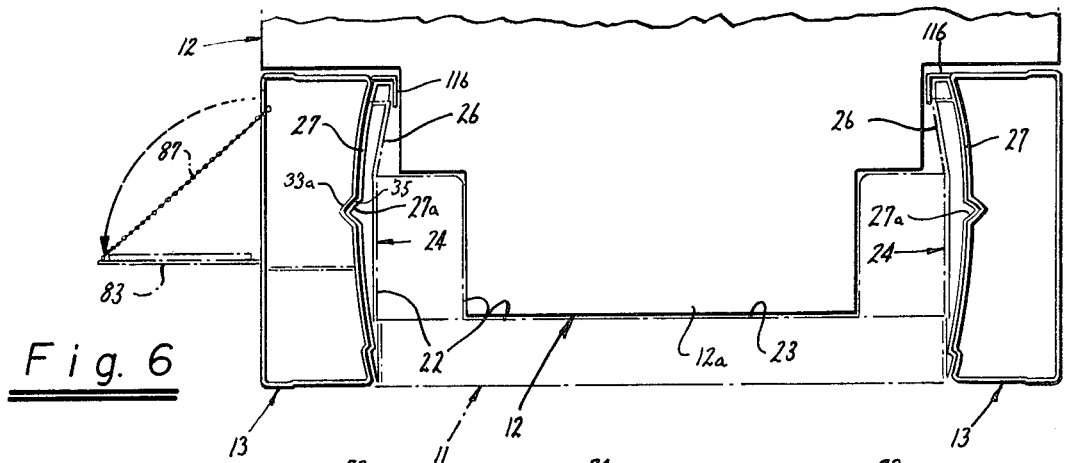
FIG. 6 is a cross-sectional view of the cabinets mounted on the pickup.

The pickup 11 is a wheeled vehicle having front and rear wheels 16 and 17 mounted upon a chassis (not shown). A motor (not shown) is mounted on the front end of the chassis and means is provided for connecting the motor to the front and/or rear wheels for driving the same. A pickup body 18 is mounted on the chassis. The pickup body includes a cab 19 that encloses the driving station for the pickup which may be entered through doors 21 provided on opposite sides of the cab. The pickup body also includes a pickup box 22 to the rear of the cab which is formed by bottom wall 23 and upstanding spaced parallel side walls 24. The side walls 24 are formed by spaced inner and outer walls 26 and 27 as can be seen from FIG. 6. The outer wall 27 extends in a generally vertical direction and is slightly curved as shown in FIG. 6. In addition, the outer wall 27 is provided with an outwardly extending reinforcing portion 27a that is generally V-shaped in cross-section and which extends longitudinally of the outer side wall 27. The portion 27a is spaced between the upper and lower extremities of the outer side wall 27. The side walls 24 are also provided with generally semicircular wheel openings or wells (not shown) to permit removal of the rear wheels 17.

The camper body 12 is of a conventional type. It is provided with a central portion 12a which is adapted to seat within the pickup or hauling area 22 within the confines of the bottom wall 23 and the side walls 24. The camper body is also provided with laterally extending portions 12b which extend over the top of the side walls 24 and beyond the side walls 24 as shown in FIG. 6. The camper body is also provided with a forwardly extending portion 12c which generally overlies the cab. The camper 12, as is well known to those skilled in the art, has a door on its rear end through which access can be obtained to the camper body. The camper body conventionally contains kitchen facilities and sleeping and dining facilities of a type well known to those skilled in the art.

Figure 1:
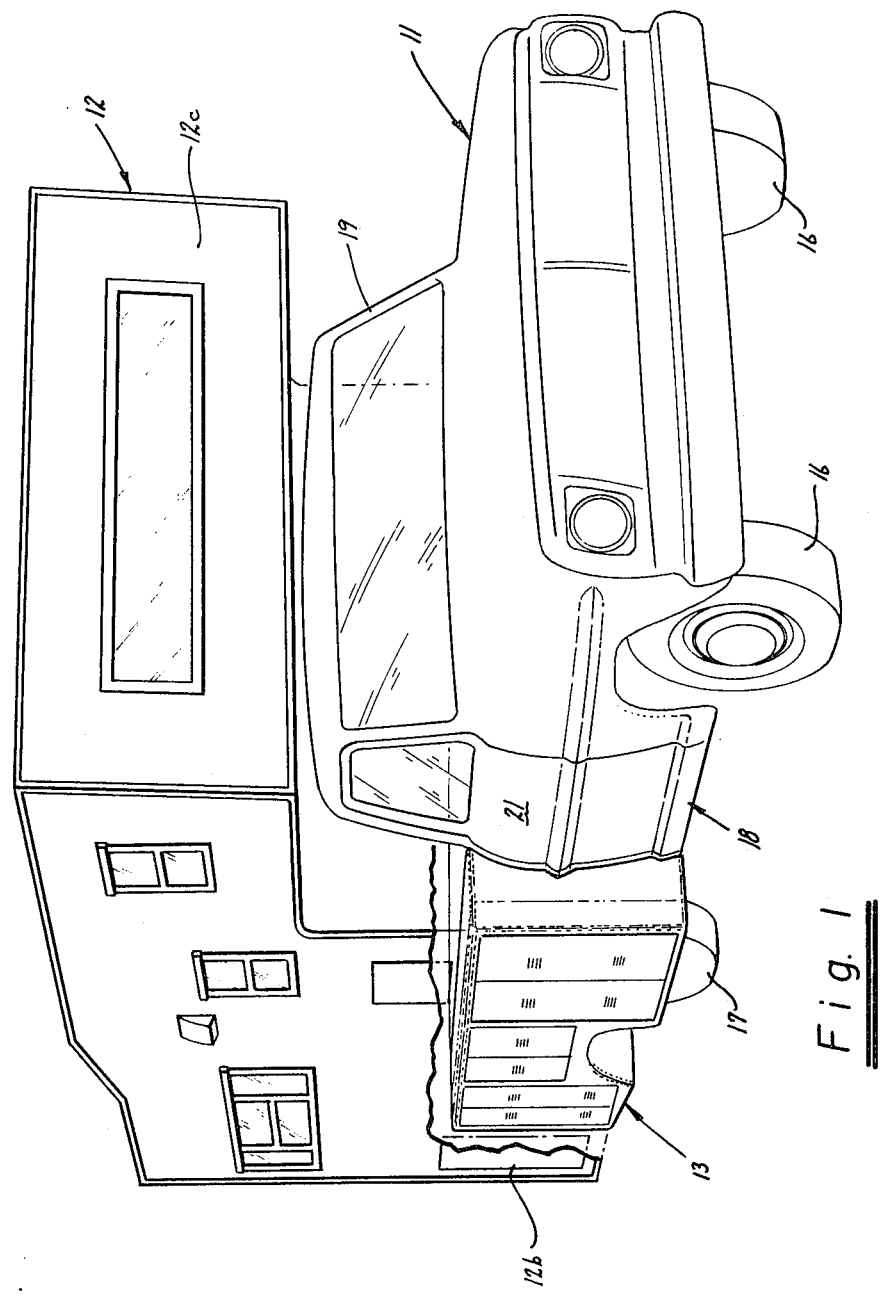
FIG. 1 is a perspective view of a camper and cabinet construction for use with the camper incorporating the present invention.
Figure 2:
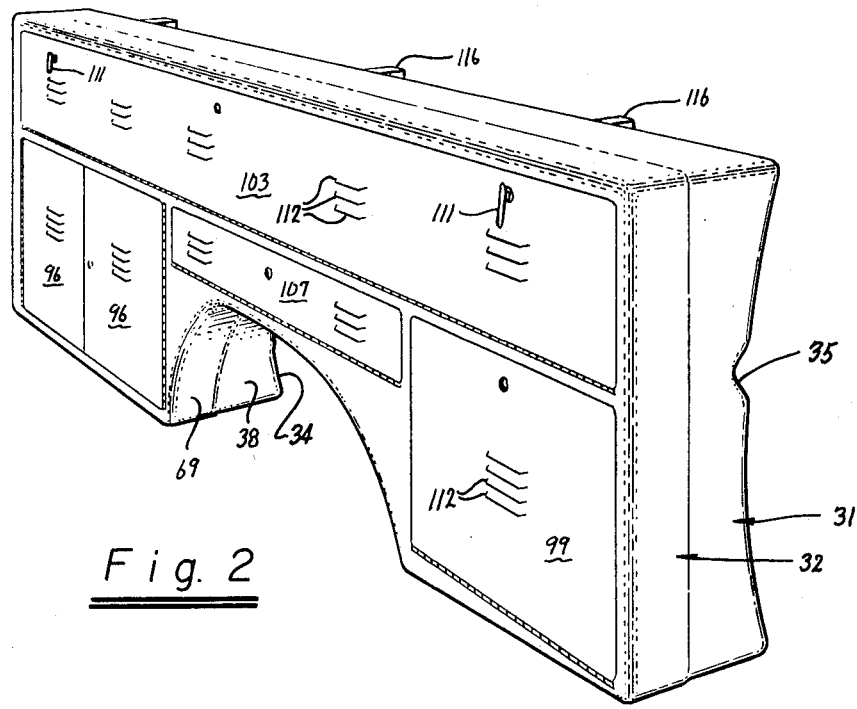
FIG. 2 is a perspective view of one of the cabinets provided in FIG. 1 and particularly shows the outside of the cabinet.

A cabinet 13 is provided on each side of the pickup and generally underlies the camper body 12 as shown particularly in FIG. 1. Each cabinet 13 consists of a box-like receptacle or housing 31 and a lid or cover 32. The box-like receptacle or housing 31 consists of a rear, generally vertical wall 33 which is contoured so that it will mate with the outer surface of the box of the pickup body. Thus as shown, the wall 33 is curved so that it conforms to the curve of the outer surface of the box of the pickup body. In addition, it is provided with an indented portion 33a which forms a recess or indentation 35 extending longitudinally of the rear wall 33 and which is shaped so it is adapted to receive the outwardly extending V-shaped portion 27a of the outer wall 27 of the box 22 for the pickup body. The rear wall 33 is also provided with a recess 34 which is in registration with the fender well of the pickup body.

Figure 3:
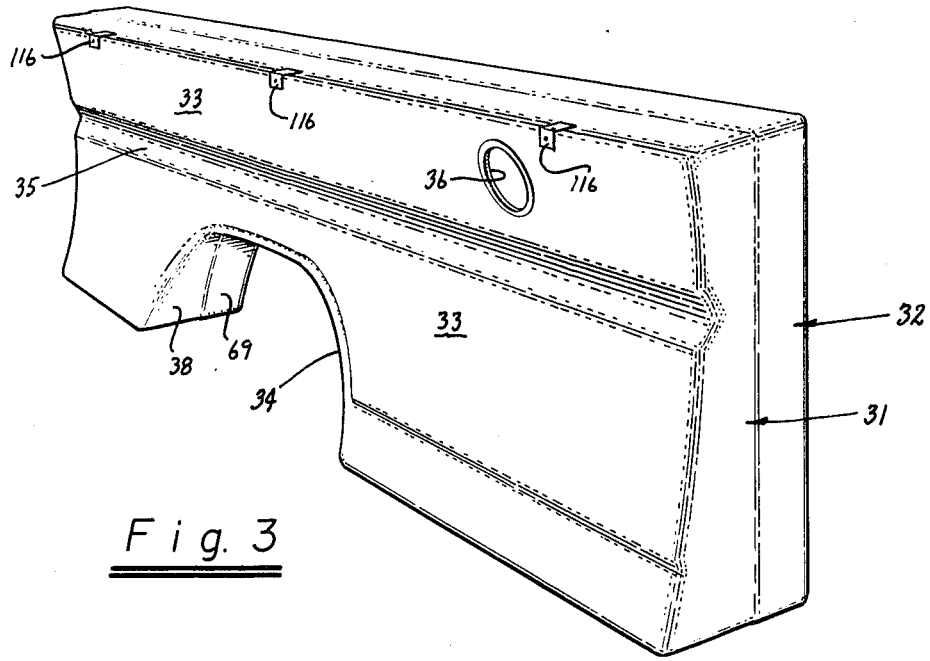
FIG. 3 is a perspective view of the other cabinet used with the camper and shows the rear side of the same.

The rear wall 33 is also provided with an additional circular opening 36 (FIG. 3) to permit access to the cap to the gasoline tank for the vehicle so that the gasoline tank can be filled when desired. It is only necessary that this opening 36 be provided in one of the cabinets 13. The receptacle or housing 31 also includes top and bottom walls 37 and 38 which are spaced and parallel and extend in a generally horizontal direction and side walls 39 and 41 which are also spaced and parallel and extend in a generally vertical direction. The top and bottom and side walls extend outwardly from the rear wall 33 at right angles thereto to provide in effect a box-like construction. The bottom wall 38 includes an upwardly curved portion 38a between the ends thereof which mates with the opening 34 provided in the rear wall 33.

The box-like receptacle, as hereinbefore described, and the lid 32 can be formed in any suitable manner. For example, it can be formed of fiber reinforced plastic in a suitable process. For example, a female mold can be prepared which has the desired configuration for the outside surface of the box-like receptacle 31. The surface can then be coated with a gel, after which a resin and a fiberglass laminate can be laid up within the mold. After curing, the box-like receptacle can be removed. Alternatively, in place of the gel, "Rigidite" supplied by Cyanamid can be utilized in a simplified mold. The resin and fiberglass are then laid up on the "Rigidite" which forms an integral part of the outer surface of the box-like receptacle that is formed.

After the shell of the box-like receptacle 31 has been formed, suitable shelving is formed in the receptacle. As can be seen from the drawings, this shelving can differ for each of the cabinets 13 provided on opposite sides of the camper body. The shelves are preferably formed of a relatively rigid material such as plywood and are then mounted in the box-like receptacle 31 in a suitable manner such as by a glassing-in process to fix them in the desired positions within the box-like receptacle and also to coat the same with a fiberglass resin composition to make them relatively water-proof and also to make them conform in appearance to the box-like receptacle.

For the cabinet provided on the right-hand side of the vehicle looking from the front of the vehicle, the right-hand cabinet 13 has a box-like receptacle 31 having the appearance shown in FIG. 7, whereas the cabinet for the left-hand side has a receptacle 31 having the appearance shown in FIG. 8. For the box-like receptacle 31 shown in FIG. 7, it can be seen that there have been provided two spaced vertical dividers or partitions 46 which are disposed on opposite ends of the curved portion 88a of the bottom wall to form large compartments 47 and 48 on opposite ends of the box-like receptacle and a center compartment 49 generally overlying the curved bottom wall portion 38. A horizontal wooden shelf 51 covered with fiberglass and plastic is secured to the dividers 46 and overlies the curved bottom wall portion 38 and forms the bottom side of the compartment 49. A storage tank 52 is provided in the compartment 49. The storage tank 52 can be utilized for storing additional gasoline for the pickup and can be connected to the fuel supply system of the pickup so that when the fuel in the tank in the pickup has been utilized, the fuel in the tank 52 can thereafter be utilized.

The box-like receptacle 31 for the left-hand side is provided with a horizontal shelf 56 similar to shelf 51 which extends the entire length of the box-like receptacle and is positioned above the curved portion 38a of the bottom wall. A pair of vertical dividers or partitions 57 extend between the bottom wall 38 and the shelf 56 and are disposed on opposite sides of the curved portion 38a. Another horizontal shelf 58 is mounted between the dividers 57 and is positioned immediately above the curved portion 38a. There is thus provided in the box-like receptacle 31 for the left-hand side of the pickup body a long storage compartment 59 on the upper part of the box-like receptacle 31 extending the length of the receptacle, a pair of compartments 61 and 62 on opposite ends of the receptacle and a small center compartment 63 immediately overlying the curved portion 38a of the bottom wall. A tank 64 is provided in the compartment 61 and can be provided for carrying additional drinking water for use in the camper body.

From the foregoing construction of the box-like receptacles, it can be seen that the shelves and partitions or dividers can be designed to provide various types of spaces or compartments within the box-like receptacles depending upon the uses to which the cabinets are to be put.

The lid 32 for each of the cabinets 13 is formed in a manner similar to the box-like receptacle 31. The lid is provided with a front wall 66 and spaced parallel top and bottom walls 67 and 68 and spaced parallel side walls 69 and 71, all of which are formed integral with the front wall 66 and extend outwardly therefrom at right angles thereto. The bottom wall 68 is provided with a curved portion 69a intermediate the ends of the bottom wall which has a configuration which corresponds generally to the configuration of the bottom wall portion 38a of the receptacle. The dimensions of the lid are such so that the lid can be mounted in telescopic fashion on the box-like receptacle 31. For example, as shown in the drawing, the dimensions of the lid can be such so that it will telescope over the outside of the receptacle as shown in the drawing.

Figure 4:
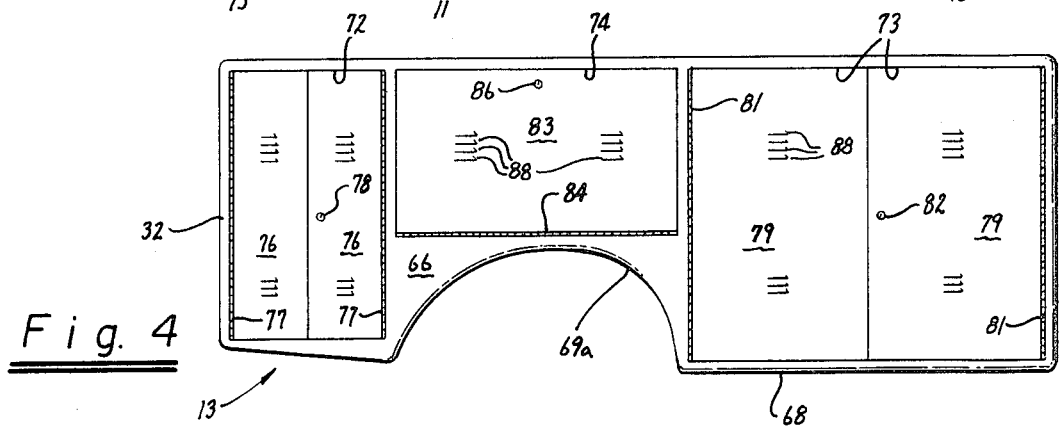
FIGS. 4 and 5 are side elevational views of the cabinets shown in FIGS. 2 and 3.
Figure 5:
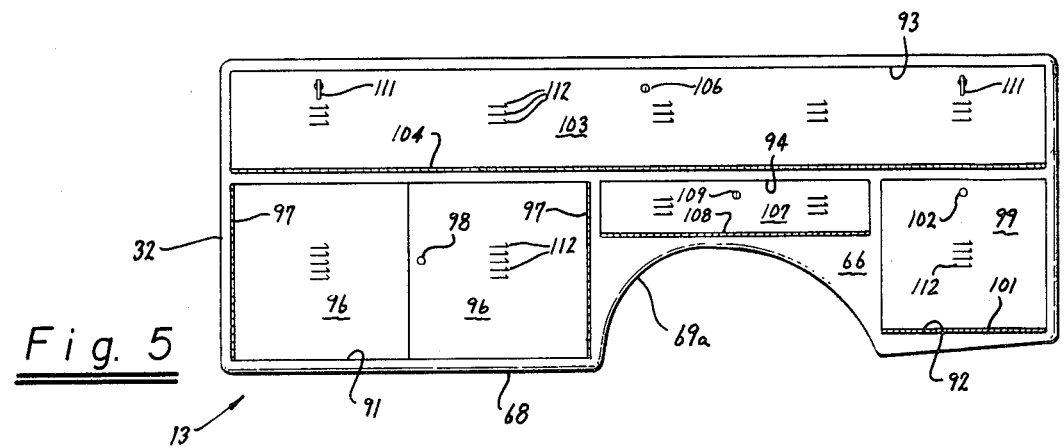

The lid for each of the cabinets is provided with a plurality of openings in the front wall or face 66 of the lid. Thus, the lid which is to be utilized for the cabinet 13 on the right-hand side of the pickup looking from the front of the pickup is provided with openings 72 and 73 on opposite sides of the lid and a center opening 74. A pair of doors 76 formed of a suitable material such as aluminum are hinged to the front wall 66 by suitable means such as piano-type hinges 77 to close the openings 72. Paddle lock 78 is provided for keeping the doors in a closed position. Similarly, a pair of doors 79 have been provided which are mounted by piano hinges 81 to close the openings 73. A paddle lock 82 is provided for retaining the doors in a closed position. A door 83 is hinged with a hinge 84 to close the opening 74. A paddle lock 86 is provided for retaining it in a closed position. As shown in FIG. 4, the door 83 is hinged along the horizontal plane on its bottom surface so that it can open downwardly as shown in FIG. 6. A pair of chains 87 are provided on opposite sides of the door for retaining the door in a generally horizontal position when it is open. The door 83, when open, can be utilized as a work table and can be used for packing and unpacking the cabinets. The doors 76, 79 and 83 are provided with louvers 88 to provide ventilation to the compartments behind the doors.

The lid for the cabinet on the left-hand side of the vehicle is provided with openings 91 and 92 on opposite ends of the lid, an opening 93 extending the length of the lid in the upper portion thereof and a smaller opening 94 between the openings 91 and 92. A pair of doors 96 mounted on vertical hinges 97 close the opening 91 and are retained in a closed position by a lock 98. A door 99 is mounted on a horizontal hinge 101 and closes the opening 92. It is retained in a closed position by a lock 102. A door 103 mounted on a horizontal hinge 104 closes the opening 93. Hand-operated latches 111 are pro-vided for retaining the door 103 in a closed position. It is locked in this position by lock 106. A door 107 mounted on a horizontal hinge 108 closes the opening 94 and is retained in a closed position by a lock 109.

The doors 96, 99, 103 and 107 are provided with louvers 112 to provide ventilation to the compartments behind the doors.

The doors 99, 103 and 107, since they are carried by horizontal hinges, can be provided with chains (not shown) for holding the doors in a generally horizontal position after they are opened so that they can be utilized to provide work space for unloading and loading the compartments.

The particular manner in which the doors are mounted in the lid is shown particularly in FIGS. 8 and 9. As can be seen, the lids are provided with recessed portions 68a which are adapted to receive the outer margins of the doors so that the outer surfaces of the doors will be flush with the outer surface of the front wall 66. Suitable reinforcing can be provided around the openings formed in the lid for each of the doors and, for example, can take the form of a rectangular framework 114 formed of a suitable material such as plastic or metal which also can be glassed in to the lid in a manner similar to that which the shelving was glassed in to the box-like receptacle 31. This reinforcing framework 114 can have a right-angle cross-section as shown, particularly in FIGS. 9 and 10.

Suitable means is provided for securing the cabinets 13 to opposite sides of the pickup body 18. As shown in the drawings, such means can consist of L-shaped brackets 116 formed of a suitable material such as steel that extend through slots 117 provided in the rear wall 33 of the box-like receptacle and which are secured by suitable means such as bolts 118 to the top wall 37 of the receptacle 31.

The cabinets 13 are mounted on the pickup body 18 by taking the receptacle 31 for each side and positioning the receptacle in such a manner that the brackets 116 overhang the top surface of the side walls of the box of the pickup body as shown particularly in FIG. 6 and so that the portions 27a of the pickup body extend into the recesses 35 provided in the rear wall of the box-like receptacle 31. The lid for each of the cabinets is then slid over the top of the receptacle and is positioned in a telescoping fashion on the receptacle so that the cabinet will have the desired width, and then the lid and receptacle are bonded together with resin and fiberglass. Generally, it is preferable that the cabinets have such a width so that the outer surface is flush with the outer surface of the camper body as shown particularly in FIG. 1. After the lid has been properly positioned, an epoxy cement is provided for cementing the lid to the receptacle to provide a unitary cabinet.

As soon as the lid has been bonded to the receptacle, there is provided a relatively rigid cabinet even though the walls are relatively thin. This is accomplished because of the box-like construction and also because of the reinforcing which is provided by the shelving within the receptacle 31. If desired, additional reinforcing can be provided merely by glassing in reinforcing members in the desired locations. As hereinbefore described, the shelving which is formed of plywood is supported within the box-like receptacle by merely glassing it in by the use of fiberglass and resin. If desired, additional support can be provided for the shelves by utilizing screws extending through the rear wall of the receptacle and extending into the shelving. The shelving in effect provides an egg crate construction which greatly reinforces the cabinet.

The use of cabinets of this type in conjunction with the camper has many advantages. Since the cabinets 13 are mounted below the camper body, they serve to lower the center of gravity of the camper so that it is more stable. The cabinets are readily accessible and can be utilized for storing many items which normally would be stored within the camper body. The cabinets, therefore, permit greater usage of the camper. For example, long articles such as mops, brooms, fishing rods and the like can be stored in the long compartment 59. Other items can be stored in the other compartments which are of various sizes. Form fitted tanks provided for carrying auxiliary fuel and water and are disposed on opposite sides of the vehicle to again stabilize the vehicle. Auxiliary pumps can be provided in the camper for utilizing the fuel and water carried in the tanks.

Since the cabinets are disposed on opposite sides of the lower portion of the camper body, they serve to provide additional insulation against cold and heat.

As hereinbefore described, the cabinets can be adjusted by utilizing the telescoping arrangement between the lid and the receptacle to obtain the desired width.

In addition, the cabinets are of a type so that they can be readily made to conform to the configuration of the pickup body on various types of vehicles. Thus, the cabinets particularly lend themselves to mounting on Chevrolet, GMC, Ford and Dodge type pickup bodies. Generally, each of the bodies has a longitudinally and outwardly extending portion corresponding to the portion 27a which is particularly advantageous in providing additional support in a vertical direction for the cabinets. It has been found that the use of the brackets 116 is adequate for supporting the cabinets on the pickup body in conjunction with the support which is provided by the longitudinal portions 27a of the camper body cooperating with the longitudinal recesses 33a of the cabinets. The camper body overlies the brackets and prevents the brackets from jumping off of the pickup body. Thus, it can be seen that it is unnecessary to modify the pickup in any way. Also, the camper body 12 and the cabinets 33 can be readily removed if it is desired to utilize the pickup in a conventional manner.

It is apparent from the foregoing that there has been provided a new and improved cabinet construction which is particularly useful with campers. The cabinets greatly increase the space available within the camper and, in addition, provide much needed additional storage space. The cabinets also make it possible to provide auxiliary tanks for fuel and water. They also help to stabilize the vehicle by lowering the center of gravity. The cabinet construction also can be used on pickups without campers. For example, they could be utilized on pickups to provide service vehicles. In this way they could be used by water, gas and power companies. They also could be used by television repairmen, electricians, sign painters, carpenters and the like.

I claim:

1. In a camper, a wheeled vehicle having a chassis with front and rear ground engaging wheels, said chassis having front and rear portions, a pickup body mounted on the chassis and having a cab overlying the front portion of the chassis and a pickup box mounted on the rear portion of the chassis, said box being formed with wheel wells for the rear ground engaging wheels and having an outwardly extending portion extending longitudinally of the same, a camper body mounted on the pickup body, said camper body having a portion extending laterally outwardly from the pickup body, a cabinet mounted on at least one side of the pickup body and generally underlying the outwardly extending portion of the camper body, said cabinet having an inwardly facing longitudinal recess therein receiving the outwardly extending portion of the box of the pickup body and bracket means carried by the cabinet for securing the cabinet to the pickup body.

2. A camper as in claim 1 wherein said bracket means includes a pair of generally L-shaped brackets which are secured to the cabinet and have portions which overhang the upper portions of the side walls forming the box of the pickup body.

3. A camper as in claim 1 wherein said cabinet is formed of a box-like receptacle which is generally rectangular in configuration and a lid which is also generally rectangular in configuration and which is telescopingly mounted on said box, said lid being bonded to said box in a position so that the cabinet has an outer surface which is generally in alignment with the outer surface of the camper body.

4. A camper as in claim 3 wherein shelving is provided within said box-like receptacle to reinforce the same and to form compartments within the cabinet.

5. A camper as in claim 1 wherein cabinets are mounted on each side of the pickup body.

6. A camper as in claim 1 wherein said cabinet is formed of resin reinforced with fiberglass.

7. A camper as in claim 3 wherein said receptacle and said lid are formed with a bottom wall having an upwardly curved portion intermediate the ends of the same to provide a recess to permit access to the rear ground engaging wheel of the vehicle.

8. A cabinet construction as in claim 4 wherein said compartments are of various sizes and wherein openings are formed in the lid together with hinged doors mounted in said openings for closing said openings.

9. In a camper, a wheeled vehicle having a chassis with front and rear grounding engaging wheels, said chassis having front and rear portions, a pickup body mounted on the chassis and having a cab overlying the front portion of the chassis, a pickup box mounted on the rear portion of the chassis, said box being formed with wheel wells for the rear ground engaging wheels, a camper body removably mounted on the pickup body, said camper body having a portion extending laterally outwardly from the pickup body, a separate cabinet removably mounted on at least one side of the pickup body and generally underlying the outwardly extending portion of the camper body, the outermost surface of the cabinet being generally flush with the outermost surface of the camper body.

10. A camper as in claim 9 wherein said cabinet extends down below the wheel well provided in the pickup box and wherein said cabinet is provided with a recess between the ends of the same permitting access to the wheel well and the pickup box.

11. A camper as in claim 10 together with removable bracket means for securing the cabinet to the pickup body, said removable bracket means having portions thereof overhanging the upper portions of the sidewalls forming the box of the pickup body whereby said camper body serves to prevent said bracket means from becoming accidentally disengaged from said pickup box.

* * * * *